L. J. R. HOLST AND N. PEDERSEN.
CAMERA MECHANISM.
APPLICATION FILED SEPT. 8, 1916.

1,311,447.

Patented July 29, 1919.

L. J. R. HOLST AND N. PEDERSEN.
CAMERA MECHANISM.
APPLICATION FILED SEPT. 8, 1916.

1,311,447.

Patented July 29, 1919.
4 SHEETS—SHEET 3.

Witness
Daniel Webster Jr.

Inventors
Ludwyk J. R. Holst
Niels Pedersen
By
their Attorney

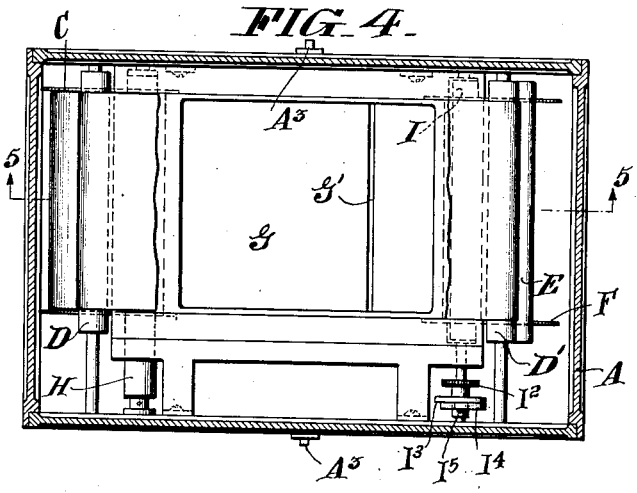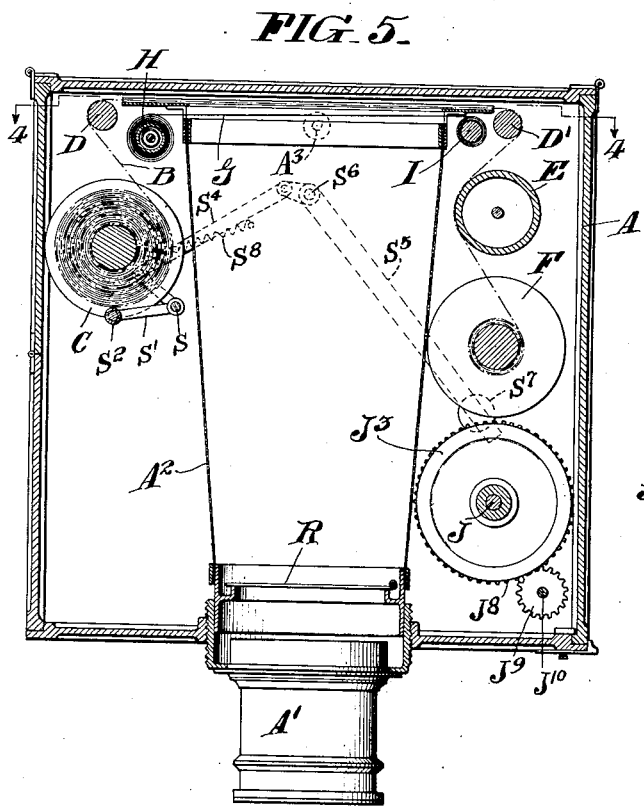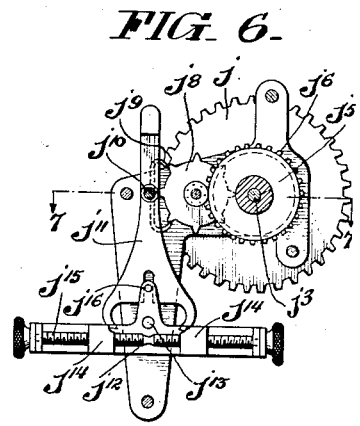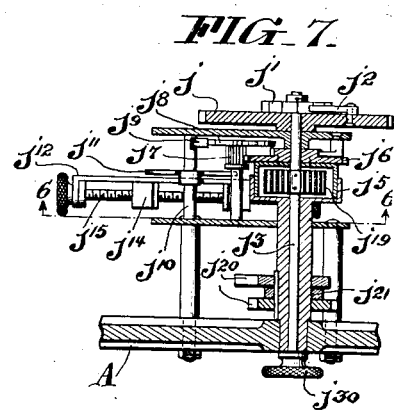

UNITED STATES PATENT OFFICE.

LODEWYK J. R. HOLST AND NIELS PEDERSEN, OF PHILADELPHIA, PENNSYLVANIA, ASSIGNORS TO ARTHUR BROCK, JR., OF PHILADELPHIA, PENNSYLVANIA.

CAMERA MECHANISM.

1,311,447.  Specification of Letters Patent.  Patented July 29, 1919.

Application filed September 8, 1916. Serial No. 118,957.

*To all whom it may concern:*

Be it known that we, LODEWYK J. R. HOLST and NIELS PEDERSEN, both citizens of the United States of America, and residents of the city and county of Philadelphia, State of Pennsylvania, have invented a certain new and useful Improvement in Camera Mechanism, of which the following is a true and exact description, reference being had to the accompanying drawings, which form a part thereof.

The object of the present invention is to provide an improved self-contained camera mechanism adapted to expose successive sections of a light sensitive film at predetermined time intervals. The improved camera mechanism was especially devised for use on an aeroplane, balloon, or the like, for taking overlapping pictures of the earth's surface, and particularly for military reconnaissance and map making purposes. While the camera mechanism is of especial value for the use stated, it is well adapted for use wherever a relatively simple and effective camera mechanism for taking a series of exposures in regular succession at predetermined time intervals is desired.

An important characteristic of the preferred camera mechanism devised by us is formed by the provisions made for utilizing a main motor intermittently operating to advance successive sections of the light sensitive material through the position for exposure, and for utilizing a separate timing motor to start the main motor at regular intervals. By using a separate timing motor, in lieu of a friction brake or analogous speed control of the main motor, we avoid the power consumption incident to the use of the last mentioned form of control, and thus make it practically feasible to employ a simple and relatively light weight form of spring motor as the main driving motor. In the preferred embodiment of our invention the light sensitive material is in the form of a continuous film, but some of the features of our invention are not limited to use in a film camera.

The various features of novelty which characterize the invention are pointed out with particularity in the claims annexed to and forming a part of this specification. For a better understanding of the invention, however, and the specific advantages obtained with it, reference should be had to the accompanying drawings and descriptive matter in which there is illustrated and described a preferred embodiment of the invention.

Of the drawings:

Fig. 4 is a somewhat diagrammatic sectional plan, the section being taken on the line 4—4 of Fig. 5;

Fig. 5 is a somewhat diagrammatic sectional elevation, the section being taken on the line 5—5 of Fig. 4;

Fig. 6 is a sectional elevation of a portion of the apparatus, the section being taken on the line 6—6 of Fig. 7; and Fig. 7 is a partial sectional plan of a portion of the apparatus, the section being taken on the line 7—7 of Fig. 6.

Figure 3:
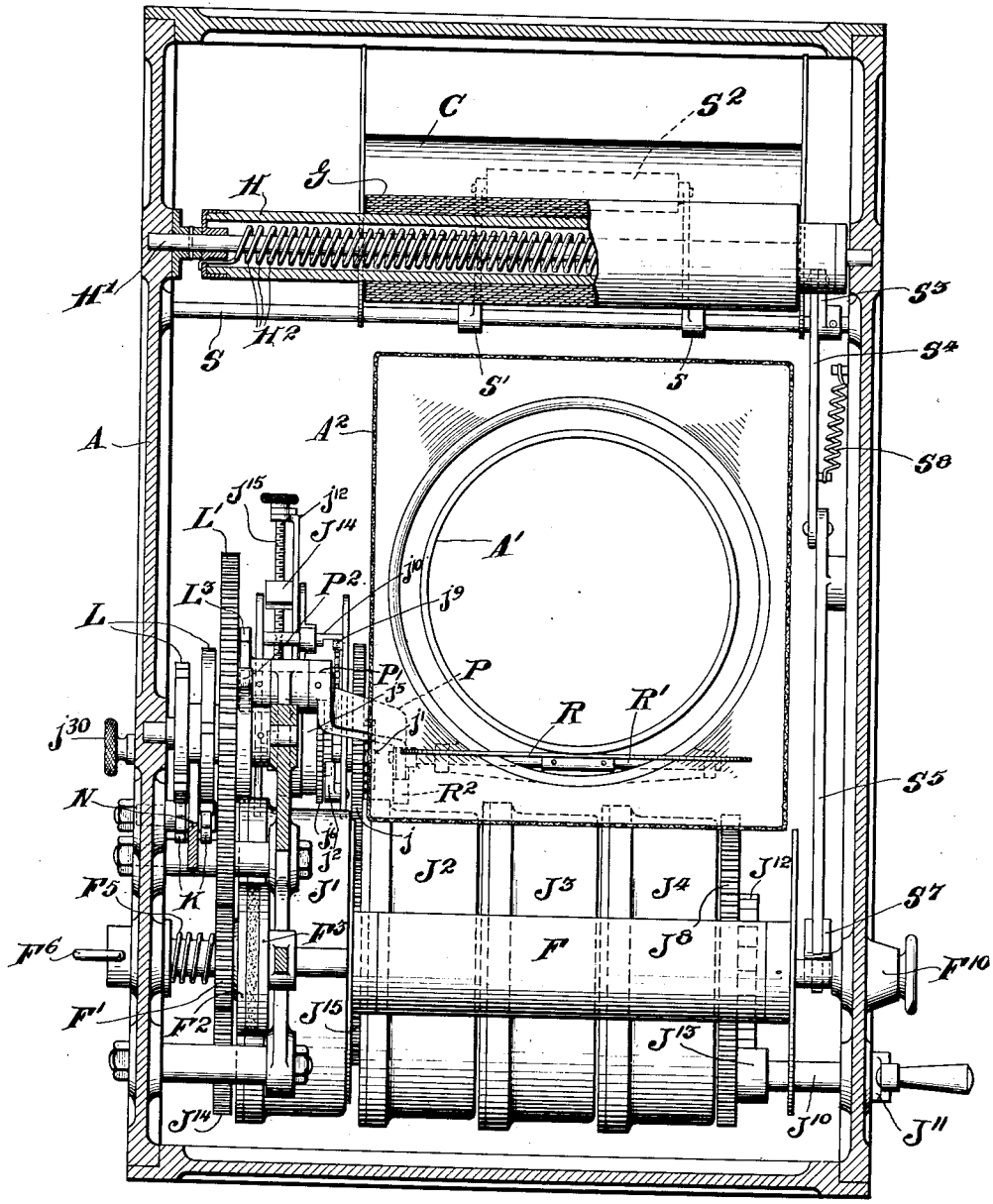
Fig. 3 is a sectional plan taken on the line 3—3 of Fig. 1.

In the drawings and referring first to the somewhat simpler diagrammatic showing of the invention found in Figs. 4 and 5, the camera comprises a camera box or casing A provided at one side or end with an aperture in which a lens holder A' is mounted and shown as provided with an opaque conical internal casing or light shield A² which fits about the lens opening at its smaller end, and terminates at its open larger end adjacent the film B. The latter is drawn from a supply roll C over the idle rolls D and D' and the spacing or measuring roll E on to a wind-up drum F. The film is intermittently advanced and exposed as hereinafter explained. The time of exposure is controlled by a shutter in the form of a flexible curtain G formed with a slot G' extending transversely to the length of the curtain and film. The curtain G is intermittently drawn across the casing A² by the film feeding mechanism driving the curtain wind-up roll I. At the time of exposure the roll I is disconnected from its driving mechanism and the curtain then quickly retracted by the spring controlled roll H. Normally the lens opening in the camera box is closed by the safety shutter R, but the latter is swung from the position shown in Fig. 5 into that shown in Figs. 1 and 3 immediately previous to each exposure. The camera is operated by a spring motor of which J represents the winding shaft.

The motor comprises spring barrels $J'$, $J^2$, $J^3$ and $J^4$ mounted on the winding shaft J and each containing a spiral spring $J^5$ having its outer end connected to the corresponding spring barrel. The inner end of the spring $J^5$ in the barrel $J'$ is connected at its inner end to a sleeve like extension $J^6$ of the hub of the barrel $J^2$ which extends into the spring barrel $J'$, and the inner ends of the springs in the barrels $J^2$ and $J^3$ are similarly connected, respectively, to the hub extensions of the spring barrels $J^3$ and $J^4$. The spring in the barrel $J^4$ is connected at its inner end to the shaft J as by means of the screw $J^7$. Adjacent the spring barrel $J^4$ is a gear $J^8$ secured to the shaft J and in mesh with a small gear $J^9$ on the winding shaft $J^{10}$. External of the camera casing the shaft $J^{10}$ is provided with a winding crank $J^{11}$. A ratchet wheel $J^{12}$ secured to the shaft J and a coöperating pawl $J^{13}$ pivotally mounted on the inner wall of the camera housing A prevents backward rotation of the motor shaft J. Secured to the spring barrel $J'$ and concentric with the latter is a spur gear $J^{14}$ through which and coöperating gears the spring motor actuates the film feeding and shutter actuating mechanism. Also secured to the spring drum $J'$ and located between it and the spring drum $J^2$ is a spur gear $J^{15}$ which is in mesh and drives the winding gear $j$ of a clock mechanism controlling the speed of operation of the camera mechanism, and thus fixing the time intervals between successive exposures.

This timing mechanism, of which the spur gear $j$ forms a part, comprises a shaft $j^3$ connected to the gear $j$ by means of a ratchet wheel $j'$ secured to the shaft $j^3$ and a pawl $j^2$ pivotally connected to the stud of the gear $j$. The shaft $j^3$ passes through a spring barrel $j^5$ and is journaled in the elongated hub portion of the latter. Within the spring barrel $j^5$ is mounted a spiral spring $j^{19}$ connected at the inner end to the shaft $j^3$ and at its outer end to the spring barrel $j^5$. The spring barrel $j^5$ has secured to it a spur gear $j^6$ which is coaxial with the shaft $j^3$ and in mesh with a lantern pinion $j^7$ secured to the shaft of an escapement disk or wheel $j^8$. Coöperating with the escapement disk $j^8$ is an escapement anchor $j^9$ carried by the rock shaft $j^{10}$ to which is also secured a lever element $j^{11}$ of a double pendulum. The latter is connected at its lower end by a pin and slot connection of which $j^{16}$ represents the pin, to a second lever element $j^{12}$ of the pendulum. The lever $j^{12}$ is pivotally supported at $j^{13}$, and is provided at its ends with bearings for a threaded shaft $j^{15}$ on which are threaded a pair of weights $j^{14}$. The two ends of the rod $j^{15}$ are oppositely threaded so that by rotating the shaft $j^{15}$ in one direction or the other, the weights will be moved toward or away from each other. The natural frequency of vibration of the double pendulum formed by the lever elements $j^{11}$ and $j^{12}$ can be increased or diminished by moving the weights $j^{14}$ toward or away from one another.

Secured to the elongated hub of the spring barrel $j^5$ are a couple of similar cam disks $j^{20}$, and an intervening cam disk $j^{21}$. The cam disks $j^{20}$ are each formed with a plurality of projections adapted to engage and shift a corresponding lever K. As shown, each of the cam disks $j^{20}$ are provided with four of these projections, or teeth, and the two cam disks have their teeth staggered so that first one and then the second of the two levers K will be shifted in regular alternation, each lever being shifted four times during each revolution of the spring drum $j^5$. The two levers K, which are similar to one another, are pivoted on a supporting shaft $K'$ and are each provided at its upper end with a hook or pawl portion $K^2$ adapted to intermittently engage and release the teeth of corresponding toothed disks L coaxial with and secured to a large gear $L'$, the arrangement being such that each time a lever K is shifted by a projection or tooth of the corresponding cam disk $j^{20}$, the upper end of the lever will be moved out of engagement with a tooth of the corresponding disk L. When thus released the gear $L'$ will be turned by the spring motor through an eighth of a turn, at the end of which the motion of the gear L will be arrested by the engagement of a tooth on the other disk L with the lever K coöperating therewith. The levers K, as shown, are gravity held in their operating positions.

The spur gear $L'$ is in mesh with a small gear $F'$ and the latter in turn is in mesh with the idler M which is also in mesh with the driving gear $J^{14}$ secured to the spring barrel $J'$. The gear $L'$ is also in mesh with an idler $M^2$ which is in mesh with a gear $E'$ secured to the shaft of the measuring roll E. The gear $F'$ is secured to the outer of two disks $F^2$ and $F^3$ which are arranged face to face and form the active elements of a friction clutch through which the gear $F'$ rotates the film winding drum F. The friction clutch disk $F^3$ is secured to the shaft $F^4$ of the film winding drum. A spring $F^5$ presses the gear $F'$ and clutch member $F^2$ against the clutch member $F^3$. $F^6$ represents a handle secured to the outer end of the drum $F^4$ to permit the manual rotation of the wind-up drum F. $F^{10}$ represents the housing of a spring friction device for adding a frictional load on the film winding drum F and $C^{10}$ represent the housings of similar friction devices at the ends of the supply roll C. These devices insure that the portion of the film between the idler rolls D and D' is always kept taut.

The spur gear E' secured to the measuring roll E drives a spur gear $I^2$ mounted on, and detachably secured to the shaft of the shutter curtain unwinding roll I through the speed reducing gears. The latter include gears $M^3$ and $M^4$ which are coaxial with and secured to one another, and are in mesh, respectively, with the gear E' and a spur gear $M^5$. The latter is coxial with and secured to a gear $M^6$ which is in mesh with the gear $I^2$. The gear $I^2$ is alternately connected to, and disconnected from the shaft of the unwinding roll I by means of a ratchet wheel $I^6$ secured to the shaft of the roll I, and a pawl $I^4$ pivoted at $I^5$ to a disk $I^3$ which is shown as integrally connected with the spur gear $I^2$. Normally the pawl $I^4$ is in engagement with a tooth of the ratchet wheel $I^6$, and the roll I thereby placed in gear with the driving gear $J^{14}$ and the intermediate gearing referred to. At regular intervals, occurring, with the mechanism shown, once for each rotation of the drum E, the pawl $I^4$ is moved out of engagement with the ratchet wheel $I^6$. This permits the portion of the shutter curtain G which has been drawn off the roll H by the unwinding roll I to be retracted.

The mechanism for disengaging the pawl $I^4$ and the ratchet $I^6$ comprises a lever N journaled on the stud K' and having its upper end adapted to move into engagement with the pawl $I^4$ when its lower end is struck by either of the two diametrically opposed projections of the cam disk $j^{21}$ which is mounted between the cam disks $j^{20}$ and secured to the hub of the spring barrel $j^5$ of the governing mechanism for the main motor. When the pawl $I^4$ and ratchet $I^6$ are disengaged the curtain shutter G is wound up on the shutter roll H, and the slit G' in the curtain G moved across the portion of the film B in line with the open upper end of the chamber $A^2$ at a predetermined rate. This rate is determined by the tension of the helical spring $H^2$ mounted within the hollow roll H, and connected at one end to the roll H, and at the other end to the stationary shaft H' on which the roll H is journaled and which is secured at its ends in the opposite walls of the camera housing.

After the shutter slit G' is thus moved across the film and an exposure thereby made, the continued operation of the mechanism causes the reëngagement of the pawl $I^4$ with the ratchet wheel $I^6$, whereupon the curtain shutter G is again wound off the roll H on to the roll I. To prevent the exposure of the film through the slit G' during this movement of the slit toward the roll I from the roll H, the safety shutter R is provided. This shutter normally occupies the closed position shown in full lines in Fig. 5, but is maintained in the wide open position shown in Figs. 1 and 3 during the period in which the pawl $I^4$ is disconnected from the ratchet wheel $I^6$. It will be understood that the feed of the shutter curtain G may be, and in practice is appreciably greater than the movement necessary to carry the slit G' across the portion of the film exposed at one time. This provides the necessary overlapping time at the beginning and ending of each shutter movement. The safety shutter R is operated by a cam $L^3$ secured to the spur gear L and provided with two teeth which successively engage the arm $P^2$ secured to a rock shaft P' carrying a second arm P. As the rock shaft P' is angularly shifted on each engagement of the teeth of the cam $L^3$ with the rock shaft arm $P^2$, the rock shaft P engages and oscillates an arm $R^2$ secured to the rock shaft R' to which the safety shutter R is secured.

When the camera mechanism is used in aerial photography it will ordinarily be connected to the frame work of the air craft on which it is mounted by a universal coupling to permit the optical axis of the camera to be maintained in parallelism with itself notwithstanding tilting and pitching movement of the air craft. As shown, the camera housing A is provided with trunnions $A^3$ adjacent its upper edge for pivotally connecting the camera housing to a gimbal frame or like portion of a universal coupling by which the camera housing is connected to the air craft.

Figure 1:
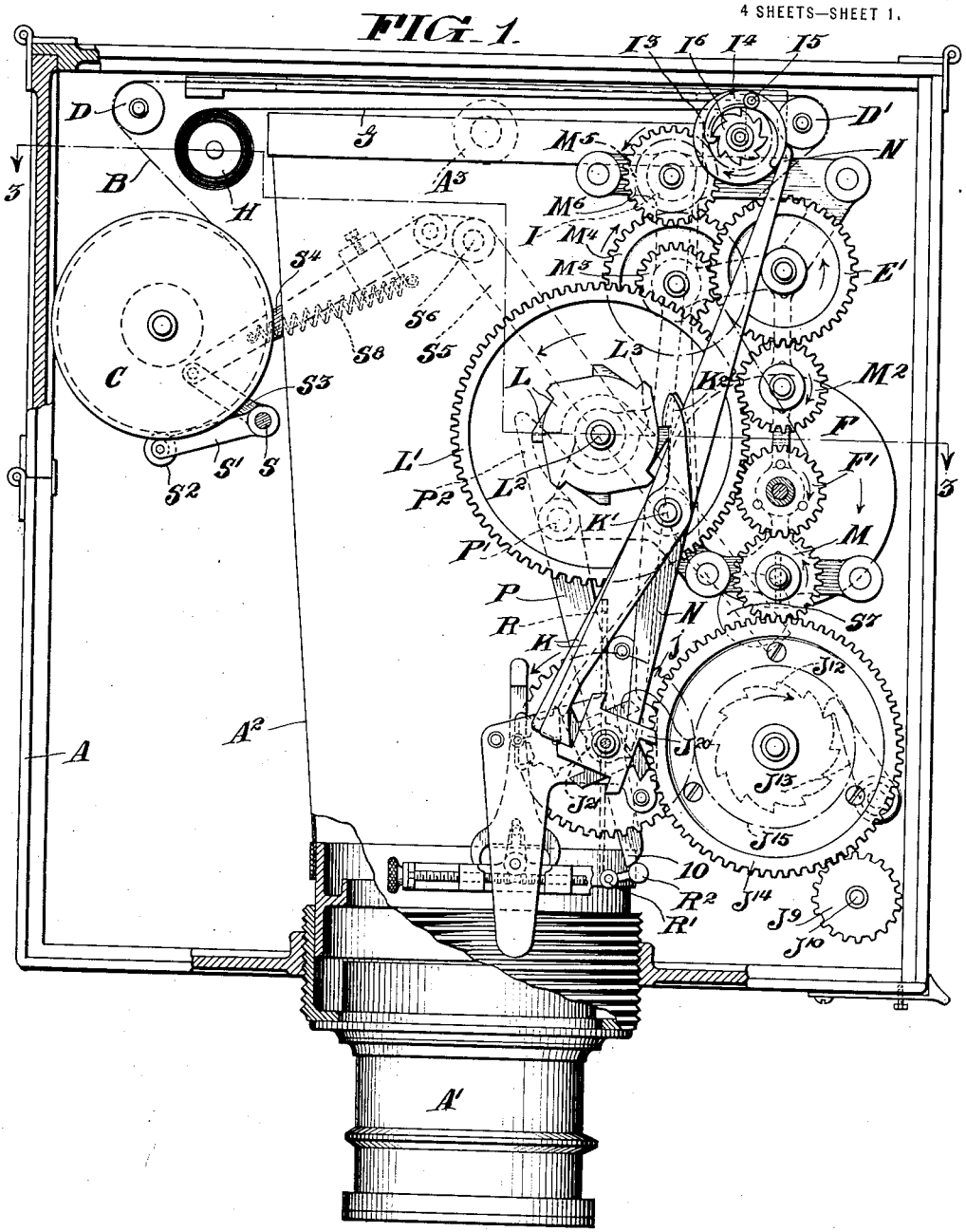
Figure 1 is a side elevation with parts broken away and in section.
Figure 2:
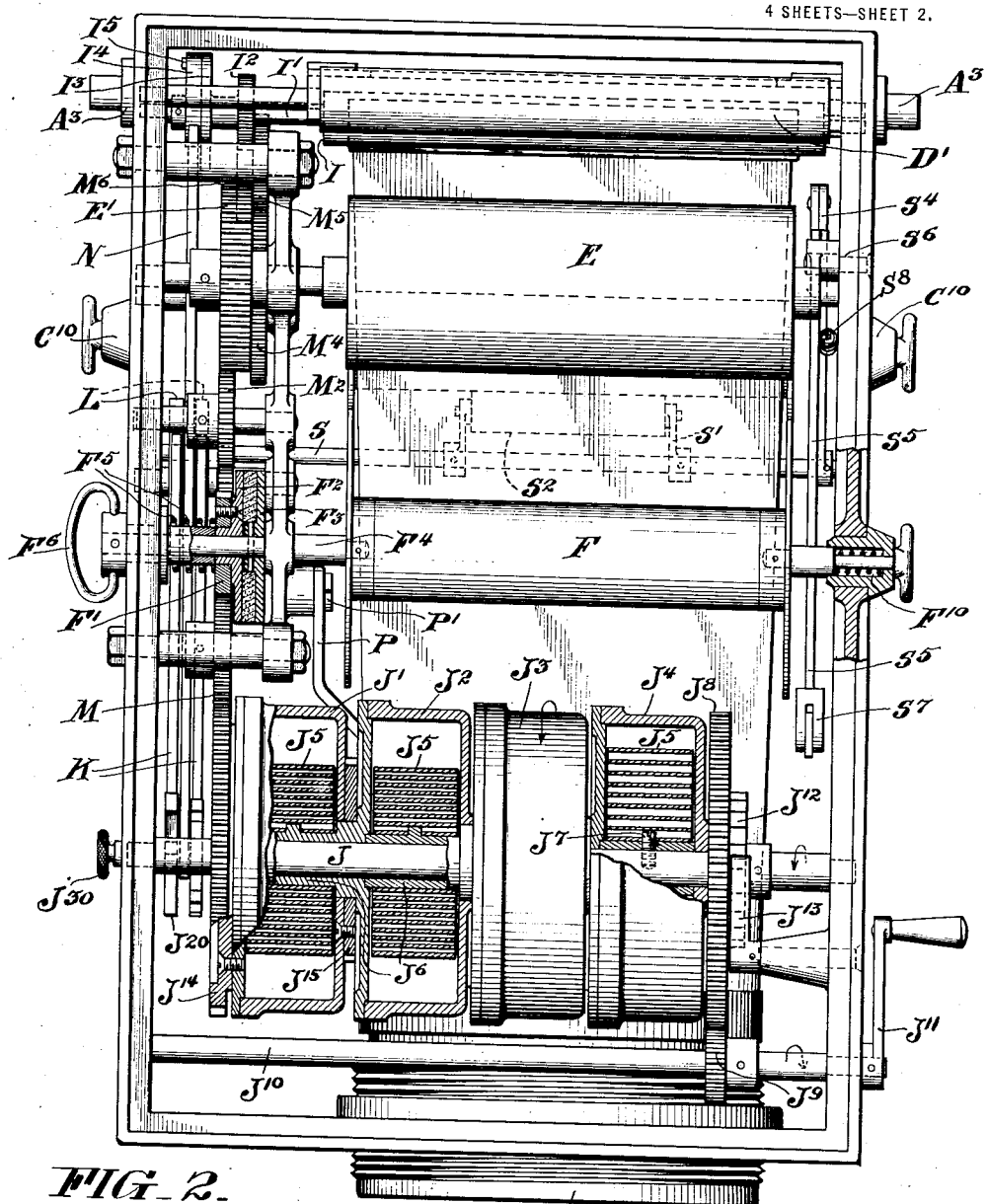
Fig. 2 is an end elevation with parts broken away and in section.

To prevent the transfer of the film from the supply roll C to the wind-up roll F from disturbing the center of gravity of the camera mechanism, and thus tending to disturb the direction of the optical axis of the camera mechanism, I provide a shifting counterweight with provisions for adjusting it to compensate for the change in film disposition. As shown, this mechanism comprises a rock shaft S carrying arms S' in which is journaled a roll $S^2$ bearing against the periphery of the film body wound about the suply roll C. The rock shaft S is provided with an arm $S^3$ connected by a link $S^4$ to one end of a lever $S^5$ which is pivotally connected at $S^6$ to the housing A of the camera. At the free end of the end arm of the lever $S^5$ is provided a counterweight $S^7$, a spring $S^8$ acting between the camera housing A and the link $S^4$ which tends at all times to hold the roll $S^2$ against the film wound about the roll C. With this arrangement, as the diameter of the film body of the roll C diminishes with a corresponding shifting of the center of gravity of the roll from the left to the right as seen in Fig. 1, the weight $S^7$ is correspondingly moved from the right to the left and any substantial change in the location of the center of gravity of the camera mechanism as a whole, is avoided.

In operation the spring drum $j^5$ is rotated by the action of the spring $j^4$ at a rate which may be adjusted by varying the distance between the weights $j^{14}$ on the pendulum lever $j^{12}$. As the spring drum $j^5$ rotates, the cam disks $j^{21}$ actuate and shift the levers K in regular succession thus successively releasing the cam disks L for angular movements of 45°. The movement thus permitted the driving gear $J^{14}$ of the spring motor moves the parts of the camera mechanism proper connected to and actuated by the spring motor, and winds up the spring $j^4$ of the timing mechanism as rapidly as the latter is permitted to unwind by its escapement. The external handle $j^{30}$ on the shaft $j^3$ of the timing mechanism, and the ratchet $j'$ and pawl $j^2$ connecting the shaft $j^3$ and the gear $j$ are provided to permit the initial tension of the spring $j^4$ to be regulated.

Once for each half revolution of the spring barrel $j^5$, disks L' and gear L, corresponding to each full revolution of the gear E' and winding drum E, the safety shutter R is swung from the closed to the wide open position, and shortly thereafter the pawl $I^4$ is disengaged from the ratchet wheel $I^6$. The parts are so arranged that this disengagement will occur at intervals during which the relative positions of the two levers K and the corresponding cam disks $j^{20}$ are such that the film is momentarily at rest. When the pawl $I^4$ and ratchet wheel $I^6$ are disengaged, the exposure controlling shutter G is drawn across the under side of the film off the roll I and onto the roll H. As the shutter slit G' moves along the surface of the film, the latter is thereby exposed. After the exposure is effected the safety shutter R closes, and the pawl $I^4$ and ratchet wheel $I^6$ again engage and set the shutter curtain G by moving the slit G' from the left to the right of the camera as seen in Fig. 1.

The spring motor mechanism proper disclosed herein comprising a main spring motor mechanism and a spring clock governor for the latter the spring of which is wound up by the main motor as fast as is required to maintain the same average tension of this spring forms no part of the present invention, but on the contrary is the invention of Niels Pedersen and is claimed in his application, Serial No. 96,890, filed May 6, 1916. The disclosed combination of this spring motor with the remainder of the mechanism form a simple and effective automatic camera mechanism embodying features of novelty, however, which do form a part of the present invention. The camera mechanism disclosed forms a simple and effective means for giving a definite and uniform feeding movement to the film between successive exposures thereof and the mechanism as a whole is well adapted by reason of its comparative simplicity, small weight and bulk, and reliability of operation for its intended use on an aeroplane or other air craft for military reconnaissance.

While in accordance with the provisions of the statutes the best forms of the invention now known to us have been illustrated and described, it will be apparent to those skilled in the art that many changes may be made in the forms of the apparatus disclosed without departing from the spirit of our invention and that certain features of our invention may sometimes be used with advantage without a corresponding use of other features.

Having now described our invention, what we claim as new and desire to secure by Letters Patent, is:

1. In a camera the combination with feeding mechanism for successively advancing sections of light sensitive material through the position of exposure, of a motor, a yielding connection through which the motor drives said feeding mechanism, means actuated by the feeding mechanism for stopping the motor following each movement of a section of the light sensitive material into the position of exposure, a shutter set by the motor during each operation of the latter, and a timing mechanism for tripping said shutter and starting said motor at regular intervals.

2. In a film camera the combination of a spring motor, film feeding mechanism including a measuring roll and means geared to and driven by said spring motor for drawing the film over said roll without slippage, and means for starting said motor at predetermined intervals and for stopping the motor after a predetermined angular movement of said measuring roll following each starting of the spring motor.

3. In a film camera, film feeding mechanism comprising in combination, a film feeding roll, a measuring roll over which the film is drawn by said feeding roll, means for intermittently giving said measuring roll a predetermined angular movement, and means, including a friction clutch, tending to so rotate the feeding roll that its peripheral speed will be greater than that of the measuring roll, but yielding to permit the film to travel about the measuring roll without slipping.

4. In a camera, the combination with means for advancing the light sensitive material through the position of exposure, of counterbalancing means automatically adjusted in response to the movement of the light sensitive material to compensate for the displacement of the latter with respect to the center of gravity of the camera and thus maintain said center of gravity substantially unchanged.

5. In a film camera, the combination with film feeding mechanism adapted to alternately advance the film a predetermined distance and then maintain the film stationary during an exposure period, of an exposure controlling shutter in the form of a slotted curtain, resilient means tending to give the shutter its movement of exposure and means connecting said shutter to said feeding mechanism during the film advancing stage to thereby put said resilient means under tension and set the shutter, and a safety shutter maintained in the closed condition by said mechanism during the film advancing period and in the open position during the film exposing period.

6. In an automatic camera the combination with feeding mechanism for intermittently moving exposed light sensitive material out of, and for moving unexposed light sensitive material into, and then maintaining it stationary in, the position for exposure during an exposure period, of an exposure controlling shutter in the form of a slotted curtain, resilient means tending to give the shutter its movement of exposure, means connecting said shutter to said feeding mechanism during the feeding period to thereby put said resilient means under tension and set the shutter, and a safety shutter maintained in the closed condition by said mechanism during the feeding period, and in the open position during the period of exposure.

7. In an automatic camera the combination with feeding mechanism for intermittently moving successive sections of light sensitive material through the position of exposure, of an intermittently operating main motor driving said feeding mechanism, a safety shutter opened and closed by the main motor during each operation of the latter, and a timing motor for starting the main motor and tripping the exposure controlling shutter at regular intervals.

LODEWYK J. R. HOLST.
NIELS PEDERSEN.